(12) United States Patent
Plattner et al.

(10) Patent No.: US 8,277,866 B2
(45) Date of Patent: *Oct. 2, 2012

(54) EXTRUDED, HIGHLY COOKED, NON-STICKY STARCH PRODUCTS

(75) Inventors: Brian S. Plattner, Sabetha, KS (US); LaVon Wenger, Sabetha, KS (US); Galen J. Rokey, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 157 days.

This patent is subject to a terminal disclaimer.

(21) Appl. No.: 12/764,827

(22) Filed: Apr. 21, 2010

(65) Prior Publication Data
US 2011/0086151 A1  Apr. 14, 2011

Related U.S. Application Data

(63) Continuation-in-part of application No. 12/587,613, filed on Oct. 8, 2009, now abandoned.

(51) Int. Cl.
*A23L 1/10* (2006.01)

(52) U.S. Cl. ........ 426/618; 426/634; 426/449; 426/450; 426/510; 426/511; 426/523; 426/661

(58) Field of Classification Search .......... 426/618–627, 426/449–450, 506–511, 516, 523, 634, 635, 426/661

See application file for complete search history.

(56) References Cited

U.S. PATENT DOCUMENTS

| | | | |
|---|---|---|---|
| 3,137,592 A | 6/1964 | Protzman et al. | |
| 3,579,352 A | 5/1971 | Bookwalter et al. | |
| 3,940,493 A | 2/1976 | Fox | |
| 4,540,592 A | 9/1985 | Myer et al. | |
| 4,769,251 A | 9/1988 | Wenger et al. | |
| 4,859,484 A | 8/1989 | Bielskis et al. | |
| 4,985,269 A | 1/1991 | Irvin et al. | |
| 5,059,439 A | 10/1991 | Wenger et al. | |
| 5,552,175 A | 9/1996 | Camburn | |
| 5,932,264 A * | 8/1999 | Hurd et al. | 426/511 |
| 6,200,623 B1 | 3/2001 | Dudacek et al. | |
| 6,210,741 B1 | 4/2001 | van Lengerich et al. | |
| 6,242,034 B1 | 6/2001 | Bhaskar et al. | |
| 6,387,429 B1 | 5/2002 | Huber et al. | |

(Continued)

FOREIGN PATENT DOCUMENTS

| | | |
|---|---|---|
| DE | 10339352 | 3/2005 |
| EP | 0836807 | 4/1998 |

OTHER PUBLICATIONS

The Effect of Extrusion Operating Conditions on the Apparent Viscosity and the Properties of Extrudates in Twin-Screw Extrusion Cooking of Maize Grits; Ilo et al.; Food Science & Technology (London) (1996), 29(7), pp. 593-598.

(Continued)

*Primary Examiner* — Drew E Becker
(74) *Attorney, Agent, or Firm* — Hovey Williams LLP

(57) ABSTRACT

Improved extruded starch-bearing products (e.g., starches, starch-bearing legumes, starch-bearing grains and formulations containing any of the foregoing) are provided having relatively high cook values and low cold water viscosities. The products are prepared by initial preconditioning to partially cook the starting material(s), followed by low shear extrusion cooking, with a total STE/SME ratio of at least about 4.

13 Claims, 10 Drawing Sheets
(6 of 10 Drawing Sheet(s) Filed in Color)

U.S. PATENT DOCUMENTS

| | | |
|---|---|---|
| 6,410,075 B1 | 6/2002 | Dudacek et al. |
| 6,422,135 B1 * | 7/2002 | Huber et al. ............... 99/353 |
| 7,521,076 B1 * | 4/2009 | Wenger et al. ............ 426/510 |
| 7,674,492 B2 | 3/2010 | Wenger et al. |
| 7,749,552 B1 * | 7/2010 | Plattner et al. ............ 426/623 |

OTHER PUBLICATIONS

Analysis of Shear and Thermal Effect on Extrusion Energy, Pressure Requirement and Viscosity of Dough; Banerjee et al.; Journal of Food Science and Technology, (Mar.-Apr. 2000) vol. 37, No. 2, pp. 184-187.

Effects of Extrusion Variables on the Properties of Waxy Hulless Barley Extrudates; Koeksel et al.; Nahrung (2004), 48(1), pp. 19-24.

Majzoobi, Mahsa, et al.; The Effect of Extrusion Cooking on the Molecular and Physical Properties of Cereal Starches; 4th International Symposium on Food Rheology and Structure, Zurich/Switzerland 2006; pp. 553-557.

* cited by examiner

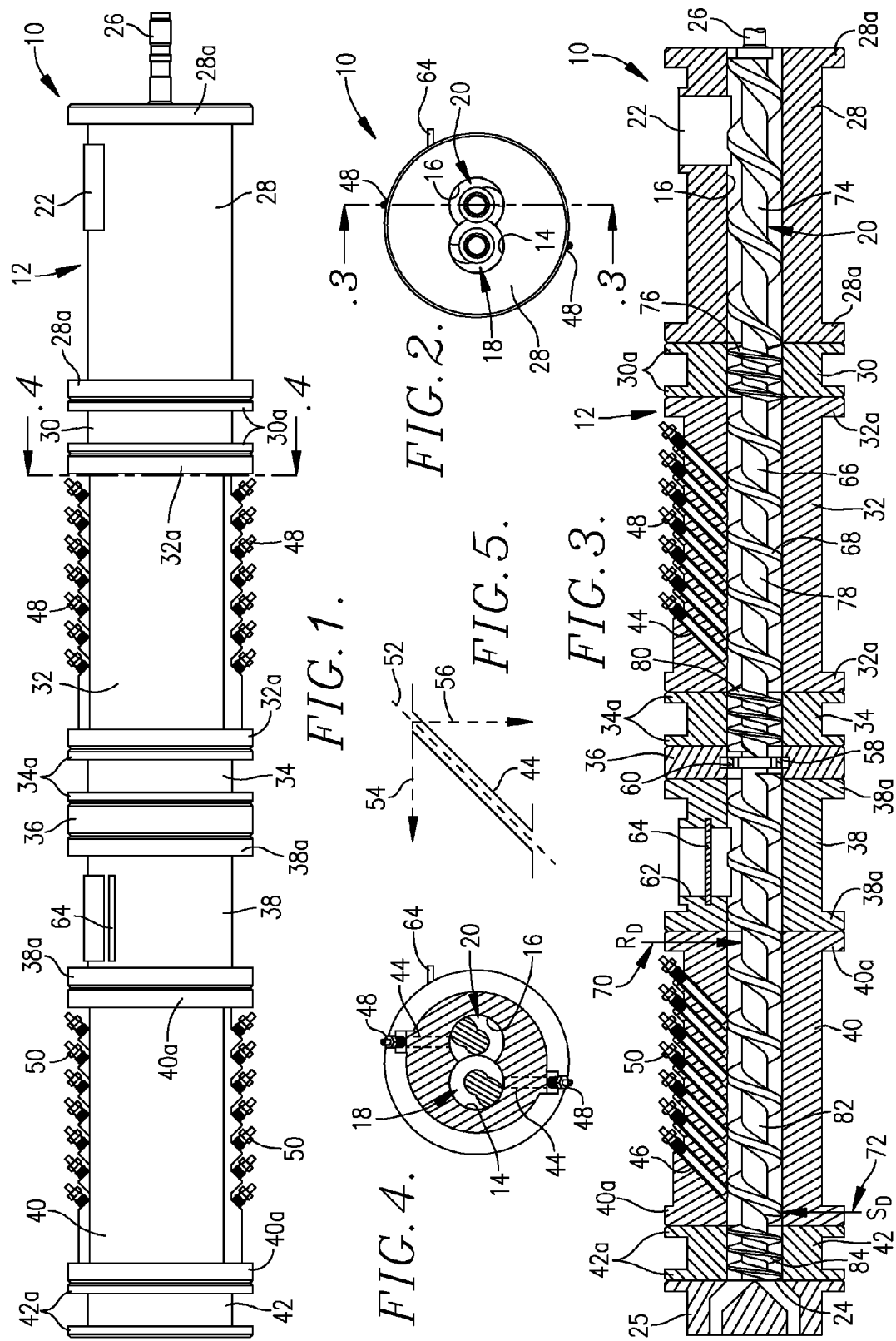

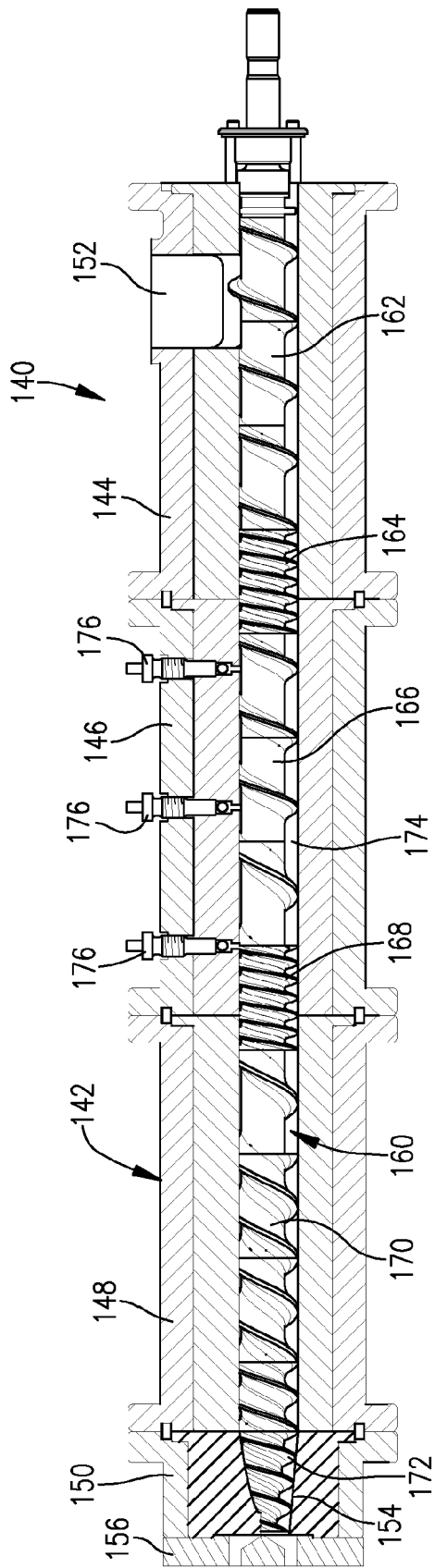
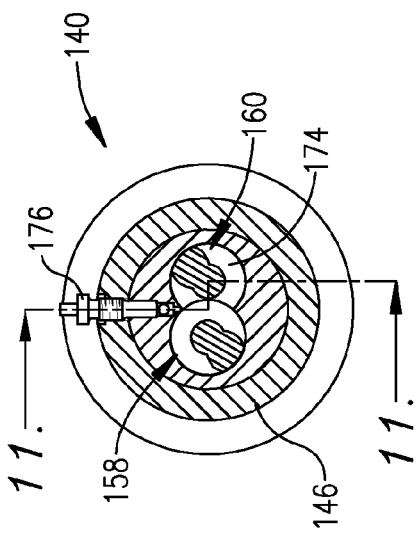
FIG. 11.
FIG. 10.

EXTRUDED, HIGHLY COOKED, NON-STICKY STARCH PRODUCTS

CROSS-REFERENCE TO RELATED APPLICATION

This application is a continuation-in-part of identically titled application Ser. No. 12/587,613, filed Oct. 8, 2009. The latter application is incorporated by reference herein in its entirety.

BACKGROUND OF THE INVENTION

1. Field of the Invention

The present invention is broadly concerned with extruded products containing or consisting essentially of a starch-bearing material, such as pure starches, legumes or grains wherein the products are non-sticky and exhibit low cold water viscosities and high cook values. More particularly, the invention is concerned with such products and methods of producing the products wherein a starting material, such as a starch-bearing grain, is initially treated by heat and moisture to partially cook the material, followed by low-shear extrusion. The total specific thermal energy (STE) and specific mechanical energy (SME) inputs from the method give a total STE/SME ratio of at least about 4. These products have functionalities equivalent to those conventionally produced by batch processes

2. Description of the Prior Art

Extrusion processing of mixtures, such as human foods or animal feeds, is well known and widely practiced. In general, extrusion processing of foods involves passing a comestible formulation into and through an elongated extruder barrel equipped with one or more elongated, helically flighted, axially rotatable screws and an endmost restricted orifice die. Steam and/or water may be injected into the barrel during such processing, and the barrel may be indirectly heated or cooled using heat exchange media. Often, the formulations are preconditioned prior to extrusion by moisturizing and heating the formulations in a specialized preconditioner device. In general, extrusion processes provide a desirable degree of cook in the final product by a combination of specific mechanical energy and specific thermal energy inputs. Typical high shear extruders have an STE/SME ratio of below 1, meaning that most of the energy is in the form of SME.

Attempts have been made to produce extruded products having starch-bearing grain(s) as the predominant or entire fraction of the starting ingredients. For example, corn or wheat flours have been extruded in an effort to produce end products suitable for use as ingredients in foods such as breads or the like. These efforts have not been successful. Instead, extruded products of this character tend to be very sticky and difficult to work, and give a "slimy" mouth feel when consumed. Accordingly, such products are conventionally produced using expensive batch processes and not by extrusion, even though the latter would be much less expensive.

Prior researchers have determined that the extent of shear in typical extrusion cooking gives starch-bearing grains very high cold water viscosities, which are one cause of the stickiness and mouth feel problems. See, e.g., Majzoobi et al., *Effect of Extrusion Cooking on the Molecular and Physical Properties of Cereal Starches*, 4$^{th}$ International Symposium on Food Rheology and Structure (2006). In addition, U.S. Pat. No. 6,422,135 describes a process for producing free-gel starch products in a low shear extrusion system. However, the methods described in the '135 patent have total STE/SME ratios on the order of 2.5-2.7, and many of the products have high cold water solubilities. Processing according to the '135 patent is also relatively expensive.

SUMMARY OF THE INVENTION

The present invention overcomes the problems outlined above and provides starch-bearing material products, which are extrusion cooked yet do not exhibit the characteristic stickiness of prior extruded materials of this character. It has been discovered that such improved products may be prepared by carefully controlling the extrusion conditions, and especially total STE/SME ratios, to achieve both a high degree of cook (at least about 55%, more preferably from about 80-95%) together with low cold water viscosity of up to 600 cP, and more preferably up to 350 cP.

Generally speaking, the preferred extrusion conditions involve an initial pretreatment of the starting material(s) in order to heat and moisturize the material(s) and achieve from about 15-60% cook, more preferably above about 30% cook. This is typically done through the use of a preconditioner upstream of an extruder; in the preconditioner, the starting materials are blended and moisturized, normally through the use of steam/water injection and paddle agitation. The treated materials are then passed through an extruder comprising an elongated tubular barrel with one or more elongated, helically flighted, axially rotating screws within the barrel. The barrel is equipped with steam injectors along the length thereof and an endmost restricted orifice die. Preferably, the extruder is a twin screw extruder specially designed to maximize steam injection. It is important that the overall method be carried out to control the inputs of STE and SME such that the STE/SME ratio is greater than about 4, and more preferably from about 4-35. Normally, significant STE is imparted during both preconditioning and extrusion. However, the bulk of SME is imparted during extrusion, with very little SME derived from preconditioning.

A variety of starch-bearing materials can be processed in accordance with the invention. For example, starches such as those selected from the group consisting of rice, wheat, corn, tapioca, potato, arrowroot, arracacha, buckwheat, barley, oat, millet, rye, banana, breadfruit, canna, colacasia, katakuri, kudzu, malanga, oca, polynesian arrowroot, sago, sorghum, sweet potato, taro, pea, and mixtures thereof are suitable. The starches may be in pure or substantially pure form, or as the corresponding grains, flours or meals. The starches may also be in native form, or modified or derivatized by any conventional technique. The starches may further be resistant starches.

The starch-bearing material may also be selected from the legumes, e.g., the various beans and bean flours, especially legumes selected from the group consisting of one or more of the following: asparagus bean or snake bean, asparagus pea, baby lima bean, black bean, black turtle bean, Boston bean, Boston navy bean, broad bean, cannellini bean, chickpeas, chili bean, coco bean, cranberry bean, Egyptian bean, Egyptian white broad bean, English bean, fava bean, fava-coceira, field pea, French green beans, frijo bola roja, frijole negro, great Northern bean, green beans, green and yellow peas, kidney beans, lima bean, Madagascar bean, Mexican black bean, Mexican red bean, molasses face bean, mung bean, mung pea, mungo bean, navy bean, pea bean, Peruvian bean, pinto bean, red bean, red eye bean, red kidney bean, rice bean, runner bean, scarlet runner bean, small red bean, small white bean, soy bean or soybean, wax bean, white kidney bean, and white pea bean.

A prime utility for the invention is the production of extruded ingredient products, which have the desirable non-sticky, low cold water solubility properties. For example, grains such as corn, wheat, and rice can be processed to give such ingredients. However, the invention is also useful for the extrusion cooking of formulations containing enough starch-bearing material that stickiness is a potential problem (e.g., at least about 25% by weight, and more usually at least about 40% by weight starch) in the formulations. Such formulations make take the form of human foods or pet feeds (e.g., dog or cat feeds). The methods of the invention also permit production of improved end products without the need for synthetic surfactants or emulsifiers. Thus, in preferred forms, the as-extruded products are essentially free of any such synthetic surfactants or emulsifiers.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a side elevational view of a cooking extruder in accordance with the invention, equipped with obliquely oriented steam injection ports and injectors;

FIG. 2 is a front end view of the cooking extruder depicted in FIG. 1;

FIG. 3 is a vertical sectional view taken along line 3-3 of FIG. 2;

FIG. 4 is a vertical sectional view taken along line 4-4 of FIG. 1;

FIG. 5 is a schematic illustration of an orthogonal resolution of the longitudinal axis of one of the extruder barrel injection ports, illustrating the resolution components;

FIG. 10 is a vertical sectional view of a twin screw extruder of a different configuration as compared with the extruder of FIGS. 1-4, having steam injection ports and injectors located along the intermeshed region of the extruder screws and oriented perpendicularly relative to the longitudinal axes of the extruder screws;

FIG. 11 is a vertical sectional view taken along line of 11-11 of FIG. 10.

DETAILED DESCRIPTION OF THE PREFERRED EMBODIMENT

Preferred Extruder

Figure 6:
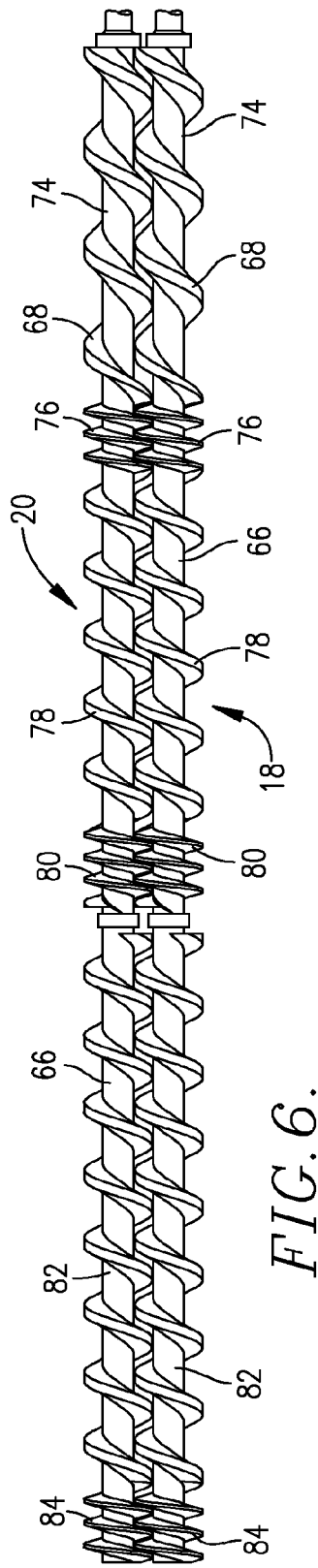
FIG. 6 is a plan view of a pair of intermeshed extruder screws for use in the preferred twin screw extruder of the invention.

Turning now to the drawing, a cooking extruder 10 in accordance with the invention includes an elongated, tubular, multiple-section barrel 12 presenting juxtaposed, intercommunicated chambers or bores 14, 16, and a pair of elongated, helically flighted, axially rotatable, juxtaposed, intercalated screws 18 and 20 within the bores 14, 16. The barrel 12 includes an inlet 22 and a spaced outlet 24 which communicate with the bores 14, 16. A restricted orifice die 25 is positioned across outlet 24 for extrusion purposes and to assist in maintaining pressure within the barrel 12. Additionally, the drive ends 26 of the screws 18, 20 are operably coupled with a drive assembly (not shown) for axially rotation of the screws 18, 20, which typically includes a drive motor and gear reduction assembly.

In more detail, the barrel 12 includes, from right to left in FIGS. 1 and 3, a series of tubular sections connected end-to-end by conventional bolts or other fasteners. Specifically, the barrel 12 has an inlet head 28, a first short steam restriction head 30, a first steam injection head 32, a second short steam restriction head 34, a mid-barrel adjustable valve assembly head 36, an adjustable steam outlet head 38, a second steam injection head 40, and third short steam restriction head 42. As illustrated, each of the heads 28-34 and 38-42 is equipped with endmost, radially enlarged connection flanges 28a-34a and 38a-42a, and all of the heads 28-42 have aligned through-bores which cooperatively form the barrel bores 14 and 16. The head 36 likewise has through bores mating with those of flanges 32a and 38a.

The heads 32 and 40 of barrel 12 are each equipped with two series of steam injection ports 44 or 46, wherein each of the ports houses an elongated steam injector 48 or 50. The two series of ports 44 in head 32 are located so as to respectively communicate with the bores 14 and 16 of the head (see FIG. 4). Similarly, the two series of ports 46 in head 40 also respectively communicate with the bores 14 and 16 of this head.

Importantly, the ports 44 and 46 are oriented at oblique angles relative to the longitudinal axes of the corresponding bores 14 and 16. In practice, the ports are oriented at an angle from about 30-85 degrees, more preferably from about 30-60 degrees and most preferably about 45 degrees, relative to these axes. Moreover, the ports 44, 46 are preferably oriented in a direction toward the outlet 24. More specifically, and referring to FIG. 5, it will be seen that each representative port 44 presents a longitudinal axis 52. If this axis 52 is orthogonally resolved into components 54 and 56, the component 54 extends in a direction toward outlet 24.

The mid-barrel adjustable valve assembly head 36 is of the type described in U.S. patent application Ser. No. 11/279,379, filed Apr. 11, 2006 and incorporated by reference herein. Briefly, the head 36 includes opposed, slidable, flow restriction components 58 and 60, which can be selectively adjusted toward and away from the central shafts of the extruder screws 18 and 20, so as to vary the restriction upon material flow and thus increase pressure and shear within the extruder 10. On the other hand, the steam outlet head 38 has a steam outlet 62 with an adjustable cover 64 permitting selective escape of steam during the course of extrusion. In some instances, a vacuum device (not shown) can be used in lieu of cover 64 for more effective withdrawal of steam and/or reduction in processing pressures.

Figure 7:
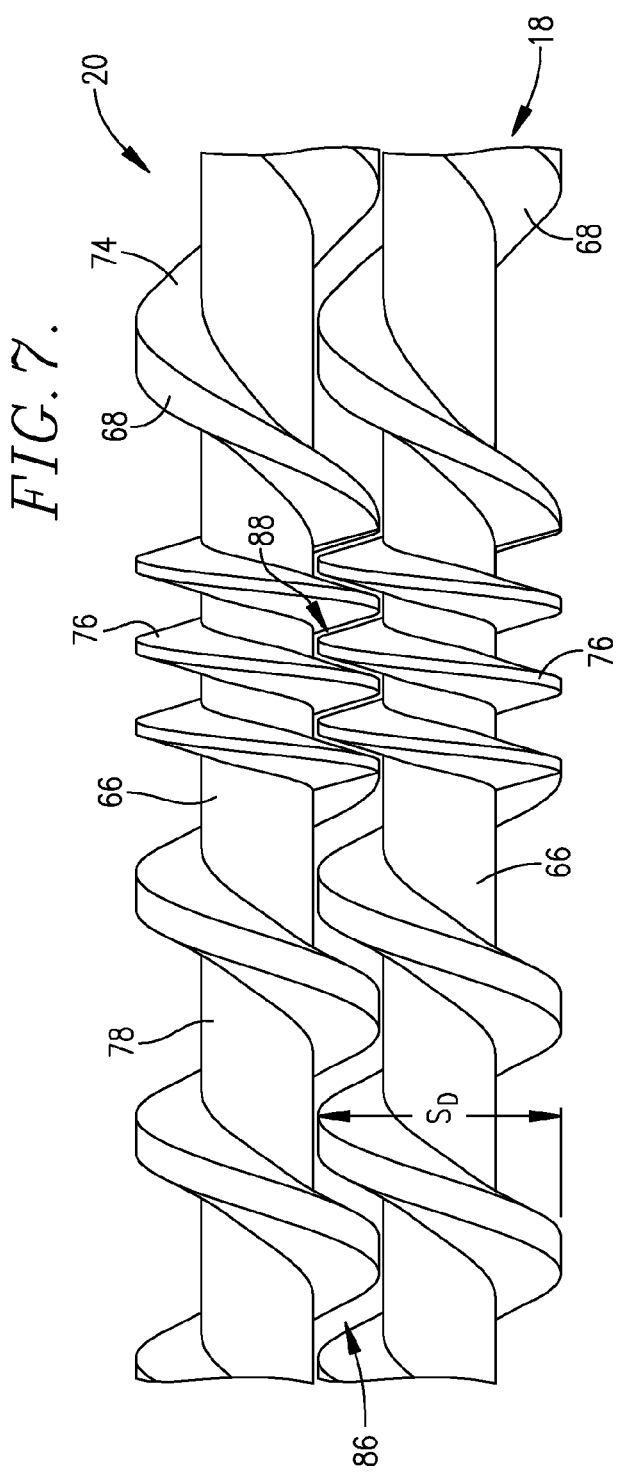
FIG. 7 is an enlarged, fragmentary view of portions of the screws of FIG. 6, illustrating the pitches and clearances between sections of the screws.
Figures 8, 9:
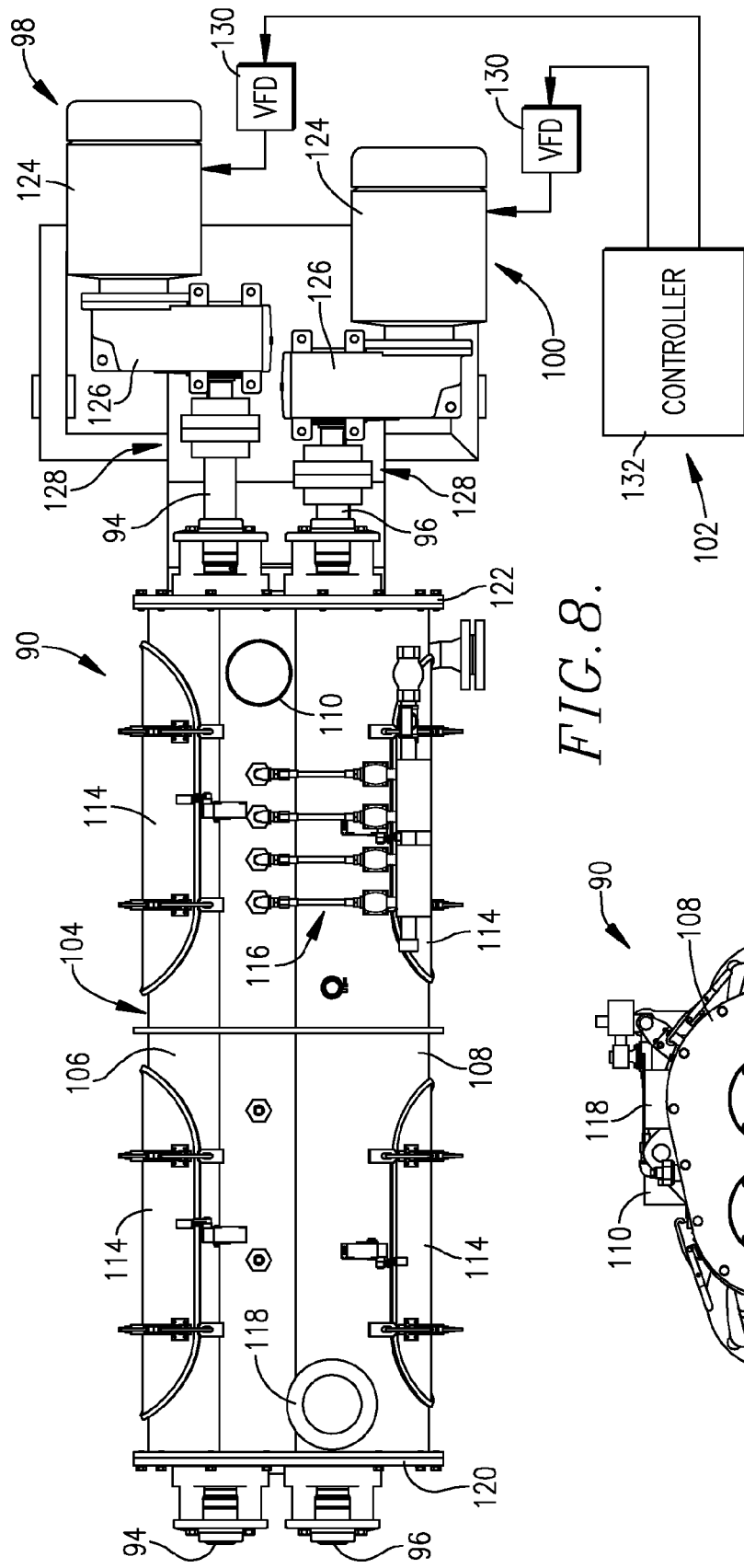
FIG. 8 is a somewhat schematic plan view of a preferred preconditioner for use with the extruder of the invention.
FIG. 9 is a front elevational view of the preconditioner of FIG. 6.

Attention is next directed to FIGS. 3 and 6-7 which depict the preferred extruder screws 18 and 20. These screws are identical in configuration, are of single flight design, and are of the co-rotating variety (i.e., the screws rotate in the same rotational direction). It will be seen that each of the screws 18, 20 broadly includes a central shaft 66 with helical fighting 68 projecting outwardly from the shaft 66. The screws 18, 20 are specially designed and have a number of novel features. These features are best described by a consideration of certain geometrical features of the screws and their relationship to each other and to the associated bores 14, 16. In particular, the shafts 66 have a root diameter $R_D$ defined by the arrow 70 of FIG. 3, as well as an outermost screw diameter $S_D$ defined by the screw fighting 68 and illustrated by arrow 72. In preferred practice, the ratio $S_D/R_D$ (the flight depth ratio) of the of the outermost screw diameter to the root diameter is from about 1.9-2.5, and most preferably about 2.35.

The individual sections of each screw fighting 68 also have different pitch lengths along screws 18, 20, which are important for reasons described below. Additionally, along certain sections of the screws 18, 20, there are different free volumes within the bores 14, 16, i.e., the total bore volume in a section of the barrel 12 less the volume occupied by the screws within that section, differs along the length of the barrel 12.

In greater detail, each screw 18, 20 includes an inlet feed section 74, a first short pitch length restriction section 76 within head 30, a first longer pitch length section 78 within head 32, a second short pitch length restriction section 80 within head 34, a second longer pitch length section 82 within heads 38 and 40, and a third short pitch length restriction section 84 within head 42. It will thus be seen that the pitch lengths of screw fighting 68 of screw sections 76, 80, and 84 are substantially smaller than the corresponding pitch lengths of the fighting 68 of the screw sections 78 and 82. In preferred practice, the pitch lengths of screw sections 76, 80, and 84 range from about 0.25-1.0 screw diameters, and are most preferably about 0.33 screw diameters. The pitch length of 78 and 82 ranges from about 1-2 screw diameters, and are more preferably about 1.5 screw diameters. The ratio of the longer pitch length to the shorter pitch length preferably ranges from about 1.5-7, more preferably from about 3-6, and most preferably about 4.5. As used herein, "screw diameter" refers to the total diameter of a screw including the fighting thereof as illustrated in FIGS. 3 and 7.

The screws 18 and 20 also have very large flight depths as measured by subtracting $R_D$ from $S_D$, and often expressed as the flight depth ratio $S_D/R_D$. This is particularly important in the long pitch sections 78 and 82, where the ratio of the pitch length to the flight depth ratio (pitch length/$S_D/R_D$ is from about 0.4-0.9, more preferable from about 0.5-0.7, and most preferably about 0.638. In the short pitch sections 76, 80 and 84, the ratio of the pitch length to the flight depth ratio is from about 0.1-0.4, more preferably from about 0.15-0.3, and most preferably about 0.213.

The intermeshed longer pitch screw sections 78 and 82 of the screws 18, 20 include a further unique feature, namely the very wide axial spacing or gap 86 between the respective screw sections. Preferably, this gap is from about 0.1-0.4 inches, more preferably from about 0.15-0.35 inches, and most preferably from about 0.236 inches. It should also be noted that the corresponding axial spacing or gap 88 between the shorter pitch screw sections 76 and 84 are much less, on the order of 0.039 inches.

These geometrical features are important in achieving the ends of the invention, and specifically permit low-shear extrusion of starch materials, as compared with conventional extruder designs. It also allows incorporation of significantly greater amounts of steam into the material passing through extruder 10, as compared with such prior designs. Accordingly, the extruder 10 is capable of producing highly cooked, starch-bearing products using significantly reduced SME inputs. The products manufactured using the extruder of the invention normally have SME inputs reduced by at least about 25%, more preferably from about 25-50%, as compared with conventionally extruded products. Further, the product densities may be 5-10%, and as-extruded moistures may be lessened by 5-15%, if desired In preferred forms, the starch-bearing materials are cooked to a minimum level of about 55%, more preferably from about 60-98%, and most preferably from about 80-95%. As used herein, cook levels are determined by the established procedure based upon the extent of starch gelatinization, which is fully described in the paper of Mason et al., entitled "*A New Method for Determining Degree of Cook*," presented at the American Association of Cereal Chemists $67^{th}$ Annual Meeting, San Antonio, Tex., Oct. 26, 1982; this paper is incorporated by reference herein in its entirety.

Furthermore, the preferred products of the invention are produced using low shear extrusion methods with the input of total SME and STE, such that the ratio of total STE to SME is above about 4, more preferably from about 4-35, and most preferably from about 8-25.

The resultant cooked products of the invention also have very low cold water viscosities, i.e., up to about 600 cP, more preferably up to about 400 cP, and most preferably up to about 350 cP. The combination of substantial cook and low cold water viscosity provides extruded products which are the functional equivalent of conventionally produced cooked products, and particularly starch-bearing grains. In order to ascertain the cold water viscosity, an RVA (Rapid Viscoamylograph Analyzer) is employed, such as an RV4 analyzer from Newport Scientific. As used herein, "cold water viscosity" refers to an analysis carried out by placing 3.5 g (dry basis) of the extruded product into 25 g of water, so that the total dry solids concentration is 12.3%. This material is placed in the RVA analyzer with a cold temperature set at 25° C. with a paddle speed of 160 rpm. The RVA analysis proceeds at this temperature and paddle speed for a period of time until complete hydration of the sample is achieved. This time is variable depending upon the type of starch-bearing product being tested. For example, corn may require up to 10 minutes of time, whereas wheat may require only 3 minutes. In any case, during the analysis period, the RVA analyzer generates a curve of time versus viscosity (cP), and after the run is complete, the maximum cold water viscosity is determined from the curve.

In practice, the restriction heads 30 and 34, and 34 and 42, together with the short pitch length screw section 76, 80 and 84 therein, cooperatively create steam flow restriction zones which inhibit the passage of injected steam past these zones. As such, the zones are a form of steam locks. Additionally, provision of the heads 32, 38, and 40 with the longer pitch length screw sections 78 and 82 therein, between the restriction zones, creates steam injection zones allowing injection of greater quantities of steam than heretofore possible. The longer pitch screw sections 78 and 82 result in decreased barrel fill (not necessarily greater free volume), and thus create steam injection zones. An examination of the screws 18, 20 stopped under normal processing conditions reveals that the screw sections 76 and 80 are completely full of material, whereas the longer pitch screw sections 78 and 82 are only partially full. The orientation of the injection ports 44 and 46, and the corresponding injectors 48 and 50 therein, further enhances the incorporation of steam into the material passing through extruder 10.

The longer pitch screw sections 78 and 82 generate excellent conveyance of materials and incomplete fill of material, allowing for the unusually high level of steam injection. Moreover, the combination of the longer pitch lengths and very wide gap 86 create increased leakage flow resulting in gentle kneading of the moistened material within these sections, particularly at relatively high screw speeds of up to 900 rpm. During wet mixing or kneading of steam and water into the material being processed, low shear conditions are maintained, and the material can pass forwardly and rearwardly through the gap 86. At the same time, the gap 86 is small enough to create the desired distributive mixing of steam and water into the material.

This combination of factors within extruder 10 allows low-shear extrusion of starch-bearing materials with the high total STE/SME ratios and high cook values described above. Stated otherwise, processing of starchy products using extruder 10 relies to a greater extent upon STE to achieve high cook, and to a lesser extent upon SME. Conventionally, only about 3-5% steam may be injected, based upon the total dry weight of the material being processed taken as 100% by weight. As used herein, "dry weight" refers to the weight of the ingredient(s) making up the material without added water but including ingredient native water. Attempts to inject greater amounts of steam in conventional extruders normally results in the excess steam simply passing backwardly through the extruder and exiting the barrel inlet. However, in the present invention, in excess of 6% by weight steam may be successfully injected without undue injected steam loss, based upon total weight of dry material within the barrel 12 at any instance taken as 100% by weight. More particularly, testing has shown that up to about 15% by weight steam may be injected, but this limit is primarily based upon steam injection capacities and not any limitations upon the ability of the extruder to accept excess steam. Broadly therefore, the invention permits introduction of from about 7-25% by weight steam, more preferably from about 10-18% by weight, and most preferably from about 11-15% by weight.

The invention is especially adapted for the low-shear production of a wide variety of starch-bearing grain products. For example, starch-bearing grains such as corn, wheat, sorghum, oats, rice and mixtures thereof can be processed with little or no surfactant to yield cooked, low cold water viscosity end products suitable for use as ingredients in complete food products such as breads and the like. These ingredient products are at least the equal of conventionally produced grains, but can be manufactured at a significantly reduced cost. Moreover, such extruded products have very little or essentially no stickiness which has characterized previous extruded grain products of these types. In addition, the extruders of the invention can be used to produce complete feeds incorporating starch-bearing grains, such as pet feeds (e.g., dog and cat feeds) and aquatic feeds (e.g., floating, slow-sinking, and fast-sinking feeds for fish or other aquatic creatures).

In the production of extruded starch-bearing products per se or wherein the starch-bearing product is a significant fraction of a formulation, typical extrusion conditions would be: barrel retention time from about 5 to 90 seconds, more preferably from about 10 to 60 seconds; maximum barrel temperature from about 80 to 220° C., more preferably from about 100 to 140° C.; maximum pressure within the barrel, from about 100 to 1000 psi, more preferably from about 250 to 600 psi; total specific energy inputs of from about 200 to 700 kJ/kg, more preferably from about 300 to 550 kJ/kg, and STE/SME ratios as described above. In the case of complete human foods or animal feeds a broad range of conditions may be employed based upon the nature of the product, but generally the extrusion conditions should be: barrel retention time from about 10 to 60 seconds, more preferably from about 20 to 50 seconds; maximum barrel temperature from about 90 to 200° C., more preferably from about 110 to 140° C.; maximum pressure within the barrel, from about 100 to 1000 psi, more preferably from about 200 to 450 psi; total specific energy inputs of from about 300 to 800 kJ/kg, more preferably from about 550 to 700 kJ/kg, and STE/SME ratios as described above.

It will also be understood that the extent of expansion of a given extrudate can greatly influence the amount of total energy input required for production of the product. Thus, a highly expanded product of low density often requires a significantly greater total energy input than otherwise identical products having no or insignificant expansion. Therefore, the contribution of SME to the total energy input would usually be increased in highly expanded products, as compared with denser products.

Although the extruder 10 illustrated in the Figures includes the use of an adjustable valve assembly head 36 and steam outlet head 38, the use of such heads is not required. The head 36 can advantageously be used as a further restriction against steam loss, and the head 38 can be used in instances where mid-barrel steam venting is desired, e.g., where denser products are desired. Further, although not shown, the extruder barrel may be equipped with external jackets for introduction of heat exchange media to indirectly heat or cool the material passing through the extruders.

Preferred Preconditioner

Turning next to FIGS. 6-7, a preferred preconditioner 90 is depicted. This preconditioner is fully illustrated and described in US Patent Publication No. 2008/0094939, incorporated by reference herein. Broadly, the preconditioner 90 includes an elongated mixing vessel 92 with a pair of parallel, elongated, axially-extending mixing shafts 94 and 96 within and extending along the length thereof. The shafts 94, 96 are operably coupled with individual variable drive devices 98 and 100, the latter in turn connected with digital control device 102. The preconditioner 90 is positioned upstream of extruder 10, such that the output from the preconditioner is directed in to the outlet 22 of extruder barrel 12.

In more detail, the vessel 92 has an elongated, transversely arcuate sidewall 104 presenting a pair of elongated, juxtaposed, intercommunicated chambers 106 and 108, as well as a material inlet 110 and a material outlet 112. The chamber 108 has a larger cross-sectional area than the adjacent chamber 106. The sidewall 104 has access doors 114 and is also equipped with injection assemblies 116 for injection of water and/or steam into the confines of vessel 92 during use of the preconditioner, and a vapor outlet 118. The opposed ends of vessel 92 have end plates 120 and 122, as shown.

Each of the shafts 94, 96 extends the full length of the corresponding chambers 106, 108 along the center line thereof, and has a plurality of radially outwardly extending paddle-type mixing elements (not shown) which are designed to agitate and mix material fed to the preconditioner, and to convey the material from inlet 110 towards and out outlet 112. The mixing elements on each shaft 94, 96 are axially offset relative to the elements on the adjacent shaft. Moreover, the mixing elements are intercalated (i.e., the elements on shaft 94 extend into the cylindrical operational envelope presented by shaft 94 and the elements thereon, and vice versa). The mixing elements may be oriented substantially perpendicularly to the shafts 94, 96. In other embodiments, the mixing elements may be adjusted in both length and pitch, at the discretion of the user.

The drives 98 and 100 are in the illustrated embodiment identical in terms of hardware, and each includes a drive motor 124, a gear reducer 126, and coupling assembly 128 serving to interconnect the corresponding gear reducer 126 and motor 124 with a shaft 94 or 96. The drives 98 and 100 also preferably have variable frequency drives 130 which are designed to permit selective, individual rotation of the shafts 94, 96 in terms of speed and/or rotational direction independently of each other. In order to provide appropriate control for the drives 98 and 100, the drives 130 are each coupled between a corresponding motor 124 and a control device 132. The control device 132 may be a controller, processor, application specific integrated circuit (ASIC), or any other type of digital or analog device capable of executing logical instructions. The device may even be a personal or server computer such as those manufactured and sold by Dell, Compaq, Gateway, or any other computer manufacturer, network computers running Windows NT, Novel Netware, Unix, or any other network operating system. The drives 130 may be programmed as desired to achieve the ends of the invention, e.g., they may be configured for different rotational speed ranges, rotational directions (i.e., either in a forward (F) direction serving to move the product toward the outlet of vessel 92, or in a reverse (R) direction moving the product backwardly to give more residence time in the vessel) and power ratings.

In preferred forms, the preconditioner 90 is supported on a weighing device in the form of a plurality of load cells 134, which are also operatively coupled with control device 132. The use of load cells 134 permits rapid, on-the-go variation in the retention time of material passing through vessel 92, as described in detail in U.S. Pat. No. 6,465,029, incorporated by reference herein.

The use of the preferred variable frequency drive mechanisms 98, 100 and control device 132 allow high-speed adjustments of the rotational speeds of the shafts 94, 96 to achieve desired preconditioning while avoiding any collisions between the intermeshed mixing elements supported on the shafts 94, 96. In general, the control device 132 and the coupled drives 130 communicate with each drive motor 124 to control the shaft speeds. Additionally, the shafts 94, 96 can be rotated in different or the same rotational directions at the discretion of the operator. Generally, the shaft 94 is rotated at a speed greater than that of the shaft 96.

Retention times for material passing through preconditioner 90 can be controlled manually by adjusting shaft speed and/or direction, or, more preferably, automatically through control device 132. Weight information from the load cells 134 is directed to control device 132, which in turn makes shaft speed and/or directional changes based upon a desired retention time.

The preconditioner 90 is commonly used for the processing of animal feed or human food materials, such as grains (e.g., wheat, corn, oats, soy), meat and meat by-products, and various additives (e.g., surfactants, vitamins, minerals, colorants). Starch products are at least partially gelatinized and cooked during passage through the preconditioner; advantageously, the cook value off of the preconditioner should be at least about 15%, more preferably from about 15-45%, and most preferably from about 25-40%. The preconditioner 10 is usually operated at temperatures of from about 100-212° F., residence times of from about 30 seconds-5 minutes, and at atmospheric or slightly above pressures.

The drive arrangement for the preconditioner 90 has the capability of rotating the shafts 94, 96 at infinitely variable speeds of up to about 1,000 rpm, more preferably from about 200-900 rpm. Moreover, the operational flexibility of operation inherent in the preconditioner design allows for greater levels of cook (i.e., starch gelatinization) as compared with similarly sized conventional preconditioners.

As noted, it is important in the methods of the invention to have controlled inputs of STE and SME throughout the method, so that the ratio of total STE (from preconditioning and extrusion) to total SME (from preconditioning and extrusion) is at least about 4, and preferably greater. As also mentioned, SME input from the preconditioner is very small in comparison with that of the extruder, and preconditioner SME may normally be ignored.

The STE from the preconditioner steam and water injections are calculated as set forth in paragraphs 1 and 2 below, whereas the corresponding STE values in the extruder are calculated as indicated in paragraphs 3 and 4. The total thermal energy is calculated in accordance with Equation 5 as the simple addition of the energies from paragraphs 1-4, and STE is calculated in accordance with paragraph 6.

1. Preconditioner thermal energy from steam, $$Q_{sp}\left(\frac{kJ}{hr}\right)$$

$$Q_{sp} = h_{sp} \cdot \dot{m}_{sp} \qquad \text{Equation 1}$$

$h_{sp}$—enthalpy of steam, found in a steam table
$\dot{m}_{sp}$—mass flow of steam to preconditioner $$h_{sp} = 2721\left(\frac{kJ}{kg}\right)(30\ psi)$$

2. Preconditioner thermal energy from water, $$Q_{wp}\left(\frac{kJ}{hr}\right)$$

$$Q_{wp} = \dot{m}_{wp} \cdot C_{pw} \cdot T_w \qquad \text{Equation 2}$$

$C_{pw}$—Specific heat of water, $$4.187\left(\frac{kJ}{kg\ °C.}\right)$$

$T_w$—Temperature of water in ° C.
$\dot{m}_{sp}$—mass flow of water to preconditioner 3. Extruder thermal energy from steam, $$Q_{se}\left(\frac{kJ}{hr}\right)$$

$$Q_{se} = h_{se} \cdot \dot{m}_{se} \qquad \text{Equation 3}$$

$h_{se}$—enthalpy of steam, found in a steam table $$h_{se} = 2770\left(\frac{kJ}{kg}\right)(100\ psi)$$

$\dot{m}_{se}$—mass flow of steam to extruder

4. Extruder thermal energy from water, $$Q_{we}\left(\frac{kJ}{hr}\right)$$

$$Q_{we} = \dot{m}_{we} \cdot C_{pw} \cdot T_w \quad \text{Equation 4}$$

$C_{pw}$—Specific heat of water, $$4.187\left(\frac{kJ}{kg\,°C.}\right)$$

$T_w$—Temperature of water in ° C.
$\dot{m}_{we}$—mass flow of water to extruder 5. Total Thermal Energy, $$Q_{te}\left(\frac{kJ}{hr}\right)$$

$$Q_{te} = Q_{sp} + Q_{wp} + Q_{se} + Q_{we} \quad \text{Equation 5}$$

6. Specific Thermal Energy, $$STE\left(\frac{kJ}{kg}\right)$$

$$STE = \frac{Q_{te}}{\dot{m}_e} \quad \text{Equation 6}$$

$\dot{m}_e$—mass flow of dry material entering extruder in kg/hr
STE values are normally calculated as kJ/kg.

SME values may be determined by direct load measurements of the extruder motor, or may be calculated using the art-recognized formula $$SME = \frac{P * \tau * \frac{RPM_{act}}{RPM_{rated}}}{\dot{m}}$$

where:
P=Motor power, expressed in kW
τ=Motor Load or Torque, expressed as a decimal expression of the rated power.
Strictly speaking, this should be the running torque minus the torque when the extruder is running empty.
$RPM_{act}$=the actual RPM of the extruder
$RPM_{rated}$=the rated RPM of the extruder, that is to say the extruder RPM when the motor is running at its rated speed (rated motor speed/gear ratio in the gearbox or speed reduction in the pulley drive system)=
$\dot{m}$=the mass flow rate of the system (kg/sec).

SME values are normally recorded in kW-hr/metric ton.

In order to determine the total STE/SME ratio, it is necessary to equate the SME units of kW-hr/metric ton to the STE units of kJ/kg. This involves application of a conversion factor of 3.6, again as well known in the art.

The following examples set forth the preferred apparatus and methods in accordance with the invention. It is to be understood, however, that these examples are provided by way of illustration and nothing therein should be taken as a limitation upon the overall scope of the invention.

Example 1

In this series of tests, commercially available ground corn was extruded using the equipment described above and illustrated in FIGS. 1-10, but without the adjustable valve 36 or outlet head 38. In all of the runs, the ground corn had a moisture content of 13.1% wb and a temperature of 20° C. The water added to the preconditioner had a temperature of 25° C.; no water was added to the extruder barrel. The smaller diameter side of the preconditioner was operated at 650 rpm in a reverse direction, whereas the larger diameter side was operated at 50 rpm in a forward direction. The extruder shaft speed in all cases was 500 rpm. SME values were determined by a direct load measurement from the extruder motor. The cook values were determined as described above.

Figure 12:
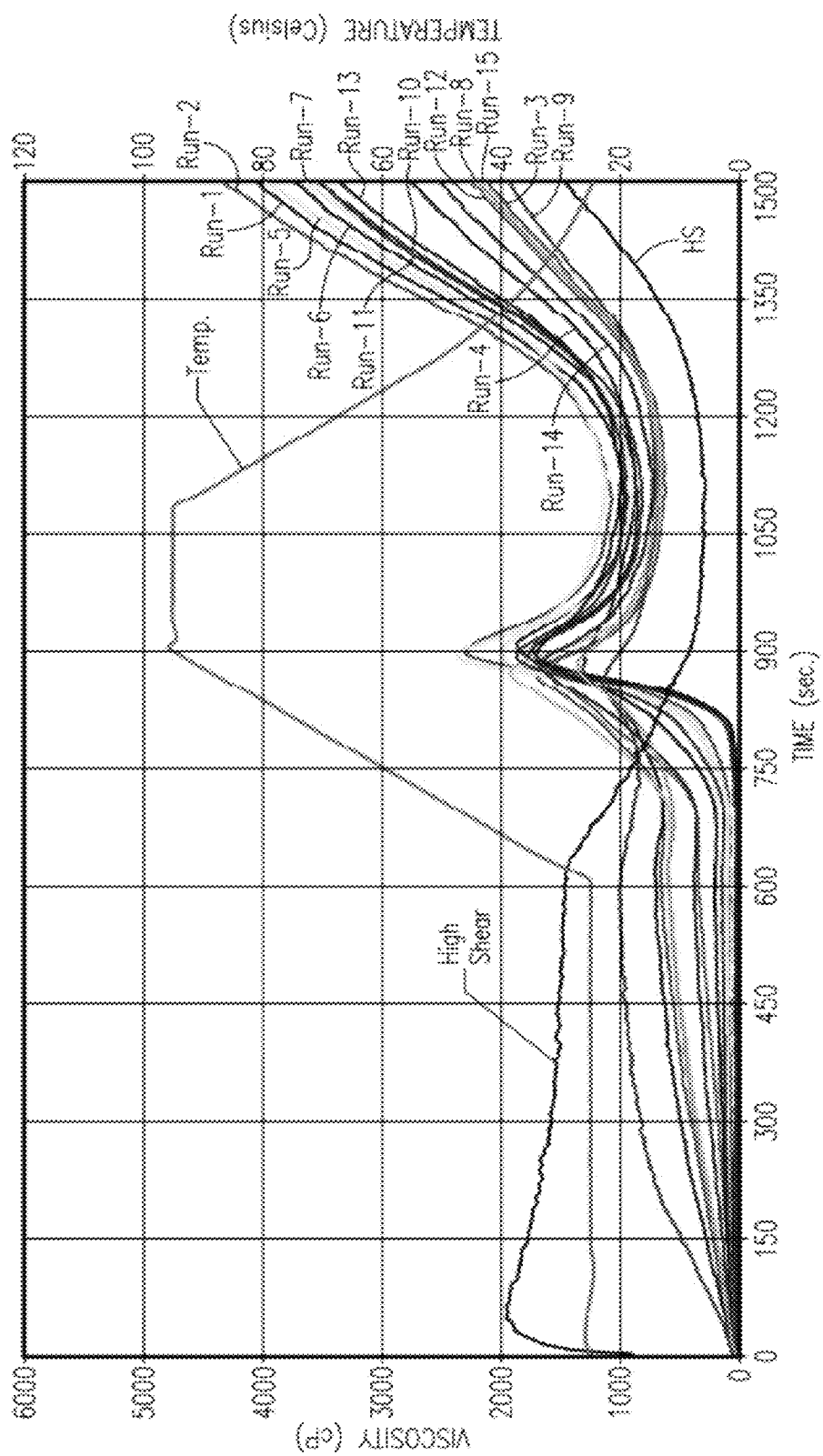
FIG. 12 is a set of RVA viscosity curves for the corn extrusion test runs of Example 1, and a comparison RVA curve for conventionally extruded corn, as described in Example 3.
Figure 12A:
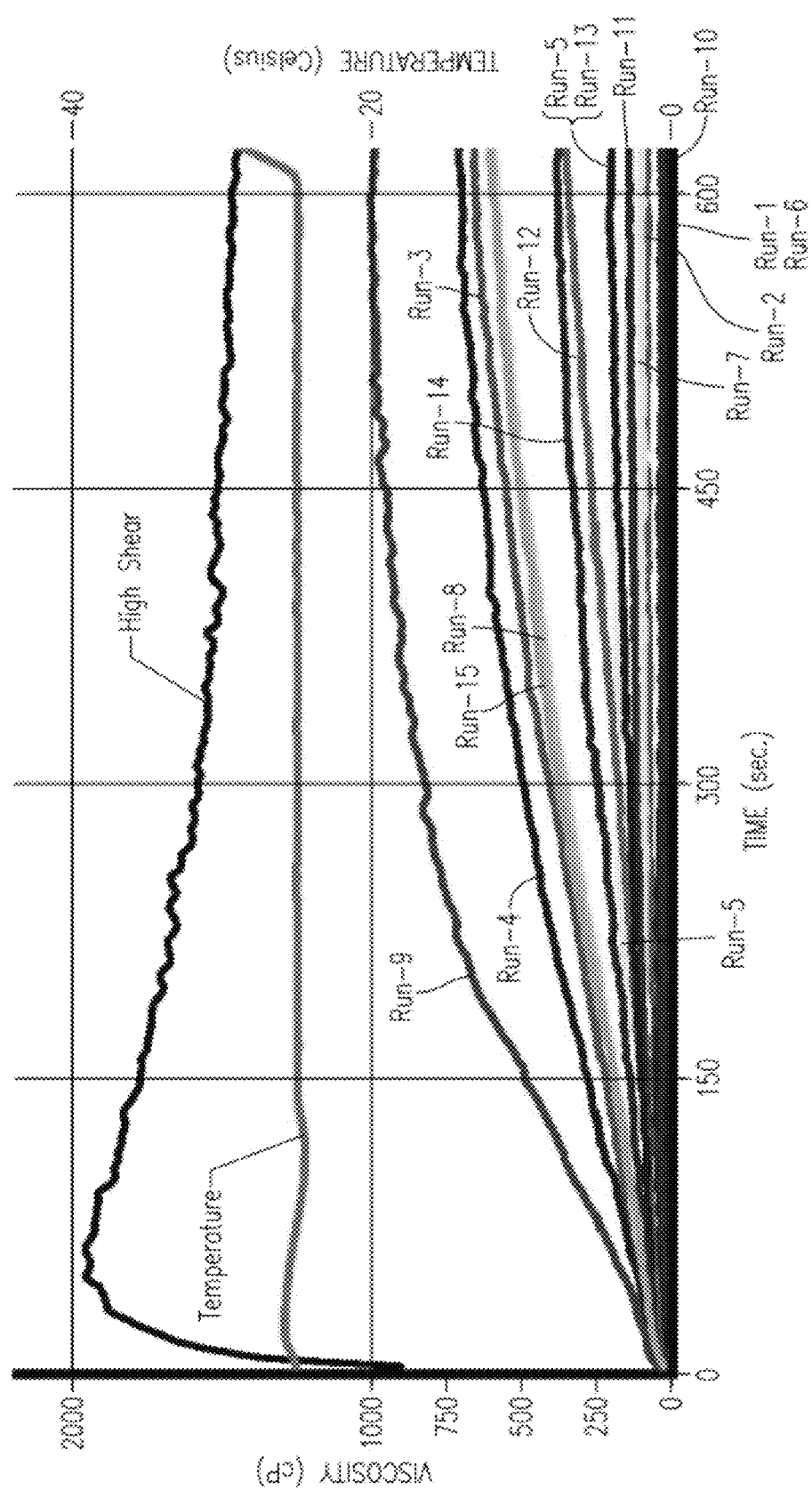
FIG. 12A is a greatly expanded partial view of the RVA curves of FIG. 12, and illustrating the region where cold water viscosities are determined.

The RVA curves for this set of runs are set forth in FIG. 12. The RVA profile used for these runs was:

| Time (min) | Temperature (° C.) | Paddle Speed (rpm) |
|---|---|---|
| 0 | 25 | 160 |
| 10 | 25 | 160 |
| 15 | 95 | 160 |
| 18 | 95 | 160 |
| 23 | 25 | 160 |
| 25 | 25 | 160 |

Each profile was generated using 3.5 grams of dry solids of the final extruded product mixed in 25 ml (or g) of water. The total dry solids concentration was thus 12.3% (3.5 g/28.5 g). The first 10 minutes of each run gave the maximum cold water viscosity for the product.

The following Table 1 sets forth the preconditioning and extrusion conditions for all runs. The products all exhibited low or essentially no stickiness, and the STE/SME ratios ranged from 5-23.

TABLE 1

| | RUN NUMBER | | | | | | | |
|---|---|---|---|---|---|---|---|---|
| | 1 | 2 | 3 | 4 | 5 | 6 | 7 | 8 |
| PRECONDITIONING INFORMATION | | | | | | | | |
| Steam Flow to P/C (kg/hr) | 113 | 115 | 126 | 127 | 120 | 117 | 110 | 113 |
| Water Flow to P/C (kg/hr) | 165 | 165 | 165 | 65 | 65 | 168 | 169 | 162 |
| P/C Discharge Temp (° C.) | 79 | 80 | 82 | 93 | 89 | 77 | 79 | 92 |
| P/C Discharge Moisture (% wb) | 24.99 | 25.18 | 24.62 | 21.63 | 20.01 | 25.36 | 24.87 | 24.17 |

TABLE 1-continued

| | | | | | | | | |
|---|---|---|---|---|---|---|---|---|
| P/C Weight (kg) | 100 | 102 | 99 | 94 | 95 | 107 | 109 | 96 |
| P/C Retention Time (min) | 3.70 | 3.80 | 3.60 | 3.60 | 3.70 | 3.90 | 3.90 | 3.90 |
| EXTRUSION INFORMATION | | | | | | | | |
| Extruder Power Used (kW) | 12.9 | 10.2 | 12.9 | 9.7 | 11.6 | 15.9 | 11 | 11.8 |
| Steam Flow to Extruder (kg/hr) | 0 | 84 | 160 | 161 | 80 | 0 | 84 | 157 |
| Extruder Discharge Moisture (% wb) | 27.56 | 29.28 | 28.52 | 23.16 | 21.87 | 26.48 | 27.5 | 27.93 |
| Extruder Discharge Temp (° C.) | 100 | 110 | 116 | 128 | 130 | 99 | 111 | 116 |
| Off Extruder Cook (%) | 64.6 | 80.8 | 95.3 | 92.5 | 89.0 | 57.5 | 85.7 | 96.5 |
| Max. Cold Water Viscosity (cP) | 34 | 94 | 655 | 704 | 209 | 64 | 108 | 589 |
| Sticky | No | No | Moderate | Moderate | No | No | No | Slightly |
| PRECONDITIONER CALCULATED CONDITIONS | | | | | | | | |
| Product Mass Flow in P/C (kg/hr) | 1642 | 1644 | 1655 | 1556 | 1549 | 1649 | 1643 | 1639 |
| Thermal Energy Added in P/C (kJ/hr) | 325267 | 330992 | 359213 | 353222 | 332780 | 335942 | 315922 | 324110 |
| STE in P/C (kJ/kg)[1] | 276 | 280 | 300 | 296 | 281 | 283 | 269 | 275 |
| P/C Discharge Energy (kJ/hr) | 291510 | 295973 | 318284 | 309737 | 293744 | 300083 | 284202 | 290535 |
| Calculated P/C Discharge Temp (° C.) | 79 | 80 | 85 | 93 | 89 | 81 | 77 | 79 |
| EXTRUDER CALCULATED CONDITIONS | | | | | | | | |
| Total Energy (kJ/hr) | 337950 | 565373 | 807924 | 790627 | 557104 | 357323 | 556482 | 767905 |
| Calculated Moist. in Extruder Barrel (% wb) | 27.8 | 31.4 | 34.7 | 30.9 | 27.3 | 28.1 | 31.3 | 34 |
| STE in Extruder Barrel (kJ/kg)[1] | 238 | 413 | 588 | 586 | 406 | 246 | 402 | 556 |
| SME (kW-hr/mton) | 9.5 | 7.5 | 9.5 | 7.1 | 8.5 | 11.7 | 8.1 | 8.7 |
| Total Specific Energy (kJ/kg)[1] | 248 | 414 | 592 | 580 | 408 | 262 | 408 | 563 |
| STE/SME Ratio | 7 | 15 | 17 | 23 | 13 | 6 | 14 | 18 |
| Temp at Die (° C.) | 92 | 140 | 183 | 198 | 153 | 96 | 138 | 177 |

| | RUN NUMBER | | | | | | |
|---|---|---|---|---|---|---|---|
| | 9 | 10 | 11 | 12 | 13 | 14 | 15 |
| PRECONDITIONING INFORMATION | | | | | | | |
| Steam Flow to P/C (kg/hr) | 116 | 109 | 113 | 121 | 26 | 307 | 252 |
| Water Flow to P/C (kg/hr) | 0 | 165 | 164 | 164 | 280 | 383 | 252 |
| P/C Discharge Temp (° C.) | 92 | 77 | 79 | 83 | 84 | 88 | 89 |
| P/C Discharge Moisture (% wb) | 16.24 | 24.33 | 24.42 | 24.5 | 24.73 | 24.59 | 21.27 |
| P/C Weight (kg) | 96 | 109 | 119 | 110 | 122 | 134 | 129 |
| P/C Retention Time (mm) | 3.90 | 4.10 | 4.00 | 4.10 | 2.80 | 2.00 | 2.10 |
| EXTRUSION INFORMATION | | | | | | | |
| Extruder Power Used (kW) | 13 | 19.2 | 14 | 12 | 16.5 | 26.9 | 27 |
| Steam Flow to Extruder (kg/hr) | 157 | 0 | 86 | 157 | 141 | 205 | 205 |
| Process Water Temp (° C.) | 25 | 25 | 25 | 25 | 25 | 25 | 25 |
| Extruder Discharge Moisture (% wb) | 20.61 | 26.53 | 28.16 | 28.77 | 27.38 | 26.52 | 24.30 |
| Extruder Discharge Temp (° C.) | 136 | 86 | 88 | 94 | 95 | 96 | 106 |
| Off Extruder Cook (%) | 94.0 | 66.5 | 88.9 | 95.8 | 90.6 | 94.2 | 97.6 |
| Maximum Cold Water Viscosity (cP) | 1007 | 47 | 147 | 344 | 212 | 381 | 600 |
| Sticky | Moderate | No | No | Slightly | No | Slightly | Slightly |
| PRECONDITIONER CALCULATED CONDITIONS | | | | | | | |
| Product Mass Flow in P/C (kg/hr) | 1480 | 1638 | 1641 | 1649 | 2758 | 3871 | 3685 |
| Thermal Energy Added in P/C (kJ/hr) | 315110 | 314475 | 324998 | 347235 | 590624 | 876214 | 712070 |
| STE in P/C (kJ/kg)[1] | 268 | 268 | 275 | 292 | 297 | 312 | 261 |
| P/C Discharge Energy (kJ/hr) | 277049 | 282814 | 291322 | 308692 | 524329 | 772647 | 638705 |
| Calculated P/C Discharge Temp (° C.) | 92 | 77 | 79 | 83 | 84 | 88 | 80 |
| EXTRUDER CALCULATED CONDITIONS | | | | | | | |
| Thermal Energy in Extruder Barrel (kJ/hr) | 711939 | 282814 | 529542 | 743582 | 914899 | 1340498 | 1206555 |
| Total Energy (kJ/hr) | 758739 | 351934 | 579942 | 784982 | 974299 | 1437337 | 1303755 |
| Calculated Moisture in Extruder Barrel (% wb) | 27.6 | 27.6 | 31.4 | 34.3 | 31.9 | 32.2 | 29.0 |
| STE in Extruder Barrel (kJ/kg)[1] | 550 | 231 | 413 | 573 | 432 | 454 | 402 |
| SME (kW-hr/mton) | 9.5 | 14.1 | 10.3 | 8.8 | 7.3 | 8.5 | 8.5 |
| Total Specific Energy (kJ/kg)[1] | 556 | 258 | 425 | 577 | 429 | 452 | 410 |
| STE/SME Ratio | 16 | 5 | 11 | 18 | 17 | 15 | 13 |
| Temp at Die (° C.) | 207 | 96 | 143 | 180 | 143 | 149 | 147 |

[1]All specific energies are calculated on an as-is dry recipe basis, i.e., the amount of specific energy per kilogram of the dry recipe ingredients per hour

Example 2

In this series of tests, commercially available wheat flour was extruded using the equipment described in Example 1. In all of the runs, the flour had a moisture content of 11.83% wb and a temperature of 20° C. The water added to the preconditioner had a temperature of 25° C.; no water was added to the extruder barrel. The extruder shaft speed in all cases was 400 rpm. The cook values were determined as described above.

Figure 13:
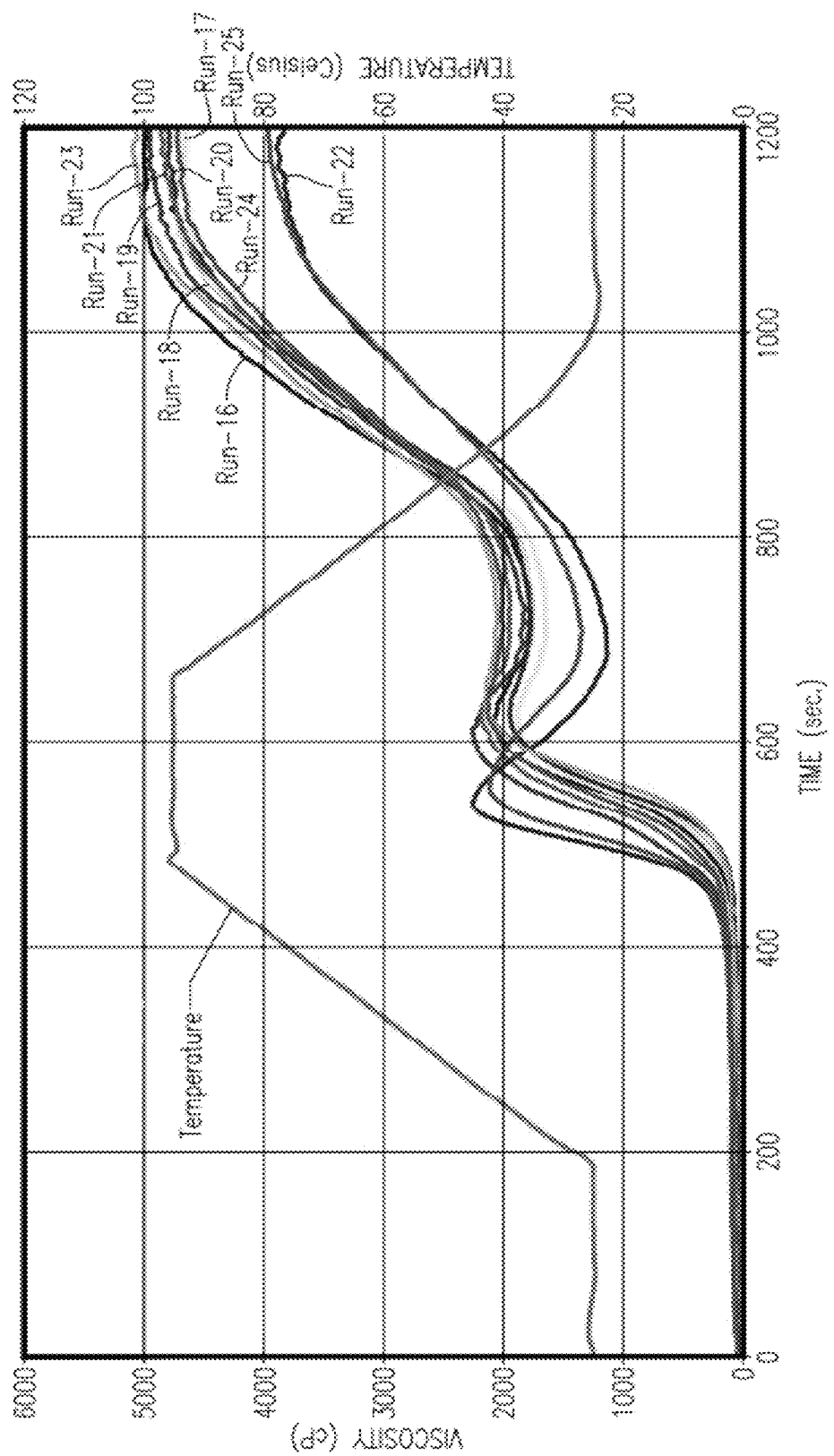
FIG. 13 is a set of RVA viscosity curves for the wheat extrusion test runs of Example 2.
Figure 13A:
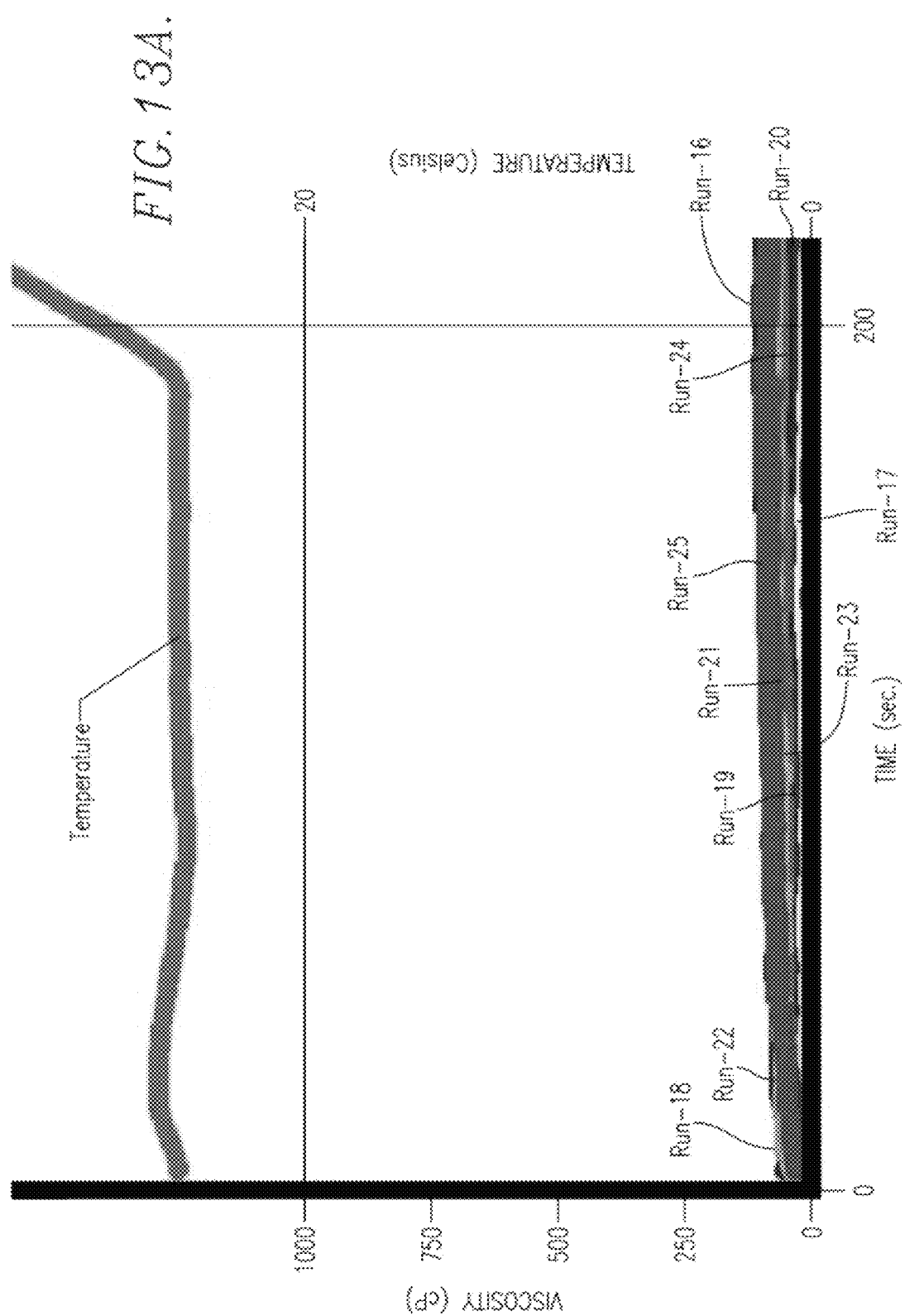
FIG. 13A is a greatly expanded partial view of the RVA curves of FIG. 13, and illustrating the region where cold water viscosities are determined.

The RVA curves for this set of runs are set forth in FIG. 13. The RVA profile used for these runs was:

| Time (min) | Temperature (° C.) | Paddle Speed (rpm) |
|---|---|---|
| 0 | 25 | 160 |
| 3 | 25 | 160 |
| 8 | 95 | 160 |
| 11 | 95 | 160 |
| 16 | 25 | 160 |
| 20 | 25 | 160 |

Each profile was generated using 3.5 grams of dry solids of the final extruded product mixed in 25 ml (or g) of water. The total dry solids concentration was thus 12.3% (3.5 g/28.5 g). The first 3 minutes of each run gave the maximum cold water viscosity of the product.

The following Table 2 sets forth the preconditioning and extrusion conditions for all runs. The products all exhibited low or essentially no stickiness, and the STE/SME ratios ranged from 8-32.

TABLE 2

| | RUN NUMBER | | | | | | | | | |
|---|---|---|---|---|---|---|---|---|---|---|
| | 16 | 17 | 18 | 19 | 20 | 21 | 22 | 23 | 24 | 25 |
| PRECONDITIONING INFORMATION | | | | | | | | | | |
| Smaller Diameter Side (rpm/direction) | 450 R | 450 R | 450 R | 450 R | 800 R | 800 R | 800 R | 900 R | 900 R | 900 R |
| Larger Diameter Side (rpm/direction) | 250 F | 250 F | 150 F | 150 F | 50 F | 50 F | 50 F | 35 F | 35 F | 35 F |
| Steam Flow to P/C (kg/hr) | 108 | 123 | 124 | 124 | 125 | 125 | 124 | 125 | 124 | 126 |
| Water Flow to P/C (kg/hr) | 182 | 270 | 270 | 270 | 269 | 269 | 270 | 270 | 270 | 270 |
| P/C Discharge Temp (° C.) | 65.6 | 70.0 | 72.2 | 73.9 | 76.7 | 77.2 | 79.4 | 81.1 | 81.7 | 82.2 |
| P/C Discharge Moisture (% wb) | 24.31 | 27.17 | 27.75 | 27.68 | 29.87 | 27.27 | 28.95 | 27.96 | 28.68 | 28.42 |
| P/C Weight (kg) | 26.8 | 27.3 | 45.5 | 45.5 | 95.5 | 98.6 | 100.5 | 120.9 | 118.2 | 90.9 |
| P/C Retention Time (min) | 0.96 | 0.92 | 1.52 | 1.53 | 3.15 | 3.16 | 3.42 | 4.01 | 3.96 | 4.10 |
| EXTRUSION INFORMATION | | | | | | | | | | |
| Extruder Power Used (kW) | 10.8 | 8.32 | 8.09 | 6.2 | 5.96 | 5.19 | 5.5 | 6.9 | 5.5 | 6.2 |
| Steam Flow to Extruder (kg/hr) | 0 | 0 | 0 | 85 | 0 | 82 | 123 | 0 | 85 | 123 |
| Extruder Discharge Moisture (% wb) | 25.56 | 30.71 | 29.88 | 32.55 | 30.76 | 34.3 | 32.09 | 30.57 | 31.41 | 32.09 |
| Extruder Discharge Temp (° C.) | 87.8 | 87.8 | 87.8 | 102.2 | 87.4 | 104.4 | 114.4 | 110.0 | 108.3 | 105.6 |
| Off Extruder Cook Value (%) | 54.2 | 60.9 | 62.5 | 87.4 | 73.0 | 91.9 | 95.8 | 78.0 | 92.7 | 97.8 |
| PRECONDITIONER CALCULATED CONDITIONS | | | | | | | | | | |
| Product Mass Flow in P/C (kg/hr) | 1654 | 1757 | 1758 | 1759 | 1758 | 1757 | 1759 | 1759 | 1759 | 1760 |
| STE in P/C (kJ/kg)[1] | 266 | 302 | 304 | 305 | 305 | 305 | 305 | 306 | 305 | 308 |
| P/C Discharge Energy (kJ/hr) | 281270 | 322780 | 324515 | 325509 | 326166 | 326495 | 325509 | 326335 | 325509 | 329489 |
| Calculated P/C Discharge Temp (° C.) | 76 | 78 | 79 | 79 | 79 | 79 | 79 | 79 | 78 | 80 |
| EXTRUDER CALCULATED CONDITIONS | | | | | | | | | | |
| Total Energy (kJ/hr) | 320072 | 352715 | 353183 | 584552 | 347223 | 571664 | 688523 | 351202 | 580759 | 691777 |
| Calculated Moisture in Extruder Barrel (% wb) | 27.3 | 31.6 | 31.6 | 34.8 | 31.6 | 34.6 | 36.1 | 31.6 | 34.8 | 36.2 |
| STE in Extruder Barrel (kJ/kg)[1] | 230 | 266 | 267 | 442 | 269 | 435 | 518 | 269 | 441 | 521 |
| SME (kW-hr/mton) | 7.9 | 6.1 | 5.8 | 5.1 | 4.3 | 3.87 | 4.0 | 5.1 | 4.0 | 4.5 |
| Total Specific Energy (kJ/kg)[1] | 235 | 259 | 259 | 429 | 255 | 419 | 503 | 257 | 426 | 507 |
| STE/SME Ratio | 8 | 12 | 13 | 27 | 17 | 32 | 36 | 15 | 30 | 32 |
| Temp at Die (° C.) | 87 | 86 | 86 | 130 | 84 | 128 | 148 | 85 | 129 | 149 |

[1]All specific energies are calculated on an as-is dry recipe basis, i.e., the amount of specific energy per kilogram of the dry recipe ingredients per hour

Example 3

In this comparative example, ground corn was extruded in a conventional high-shear extruder with an upstream Wenger DDC preconditioner of the type illustrated and described in U.S. Pat. No. 4,752,139. The following Table 3 sets forth the conditions for this run.

TABLE 3

|  | RUN NUMBER 26 |
| --- | --- |
| DRY RECIPE INFORMATION | |
| Dry Recipe Moisture Content (% wb) | 10 |
| Dry Recipe Temp (° C.) | 20 |
| Dry Recipe Rate (kg/hr) | 180 |
| PRECONDITIONING INFORMATION | |
| Steam Flow to P/C (kg/hr) | 4.4 |
| Water Flow to P/C (kg/hr) | 8 |
| Process Water Temp (° C.) | 20 |
| Recorded P/C Discharge Temp (° C.) | 51 |
| EXTRUSION INFORMATION | |
| Extruder Shaft Speed (rpm) | 321 |
| Motor Load (%) | 60 |
| Water Flow to Extruder (kg/hr) | 2.1 |
| Process Water Temp (° C.) | 20 |
| Extruder Motor Power (hp) | 50 |
| Rated Shaft Speed (rpm) | 508 |
| PRECONDITIONER CALCULATED CONDITIONS | |
| Calculated Moisture in P/C (% wb) | 15.8 |
| Product Mass Flow in P/C (kg/hr) | 192 |
| Thermal Energy Added in P/C (kJ/hr) | 12521 |
| Total Thermal Energy in P/C (kJ/hr) | 18889 |
| STE in P/C (kJ/kg)[1] | 105 |
| P/C Discharge Energy (kJ/hr) | 18885 |
| Calculated P/C Discharge Temp (° C.) | 51 |
| EXTRUDER CALCULATED CONDITIONS | |
| Mass Flow in Extruder (kg/hr) | 194 |
| Thermal Energy in Extruder Barrel (kJ/hr) | 19060 |
| Extruder Motor Power (kW) | 37.3 |
| Total Mechanical Energy (kJ/hr) | 50910 |
| Total Energy (kJ/hr) | 69970 |
| Calculated Moisture in Extruder Barrel (% wb) | 16.7 |
| STE in Extruder Barrel (kJ/kg)[1] | 71 |

TABLE 3-continued

|  | RUN NUMBER 26 |
| --- | --- |
| SME (kW-hr/mton) | 79 |
| Total Specific Energy (kJ/kg)[1] | 150 |
| STE/SME Ratio | 0.25 |
| Temp at Die (° C.) | 185 |

The product from this run was very sticky and difficult to handle. It would not be a commercially acceptable product.

A review of the foregoing Examples and FIGS. 12, 12A, 13, and 13A confirms that the extrusion systems of the invention are capable of producing cooked, non-sticky, low cold water viscosity end products which are in every way the equal of conventional products of the same class. The cold water viscosities of the products of the invention are significantly lower than that of the high shear (HS) comparative product of Example 3 (see FIG. 12A). These effects are achieved through initial partial cooking in the preconditioner, followed by extrusion with maintenance of desirable STE/SME ratios during the course of processing. Detailed photographs of the end products of the invention demonstrate that the starch content thereof retains a measure of the characteristic starch granule structure, believed to be a key reason for the attributes of these products.

Example 4

Figure 14:
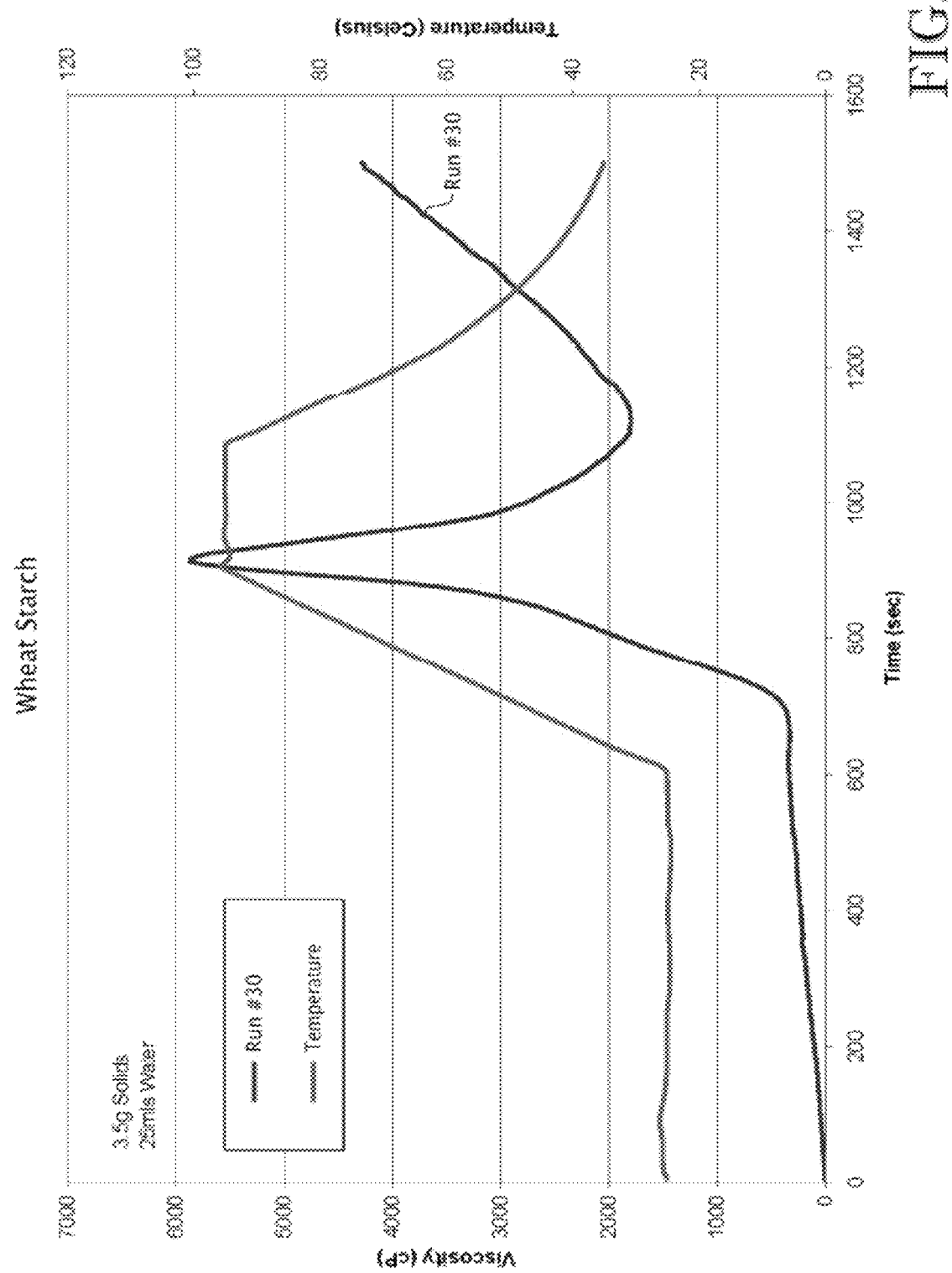
FIG. 14 is an RVA curve for the wheat starch run of Example 4.
Figure 15:
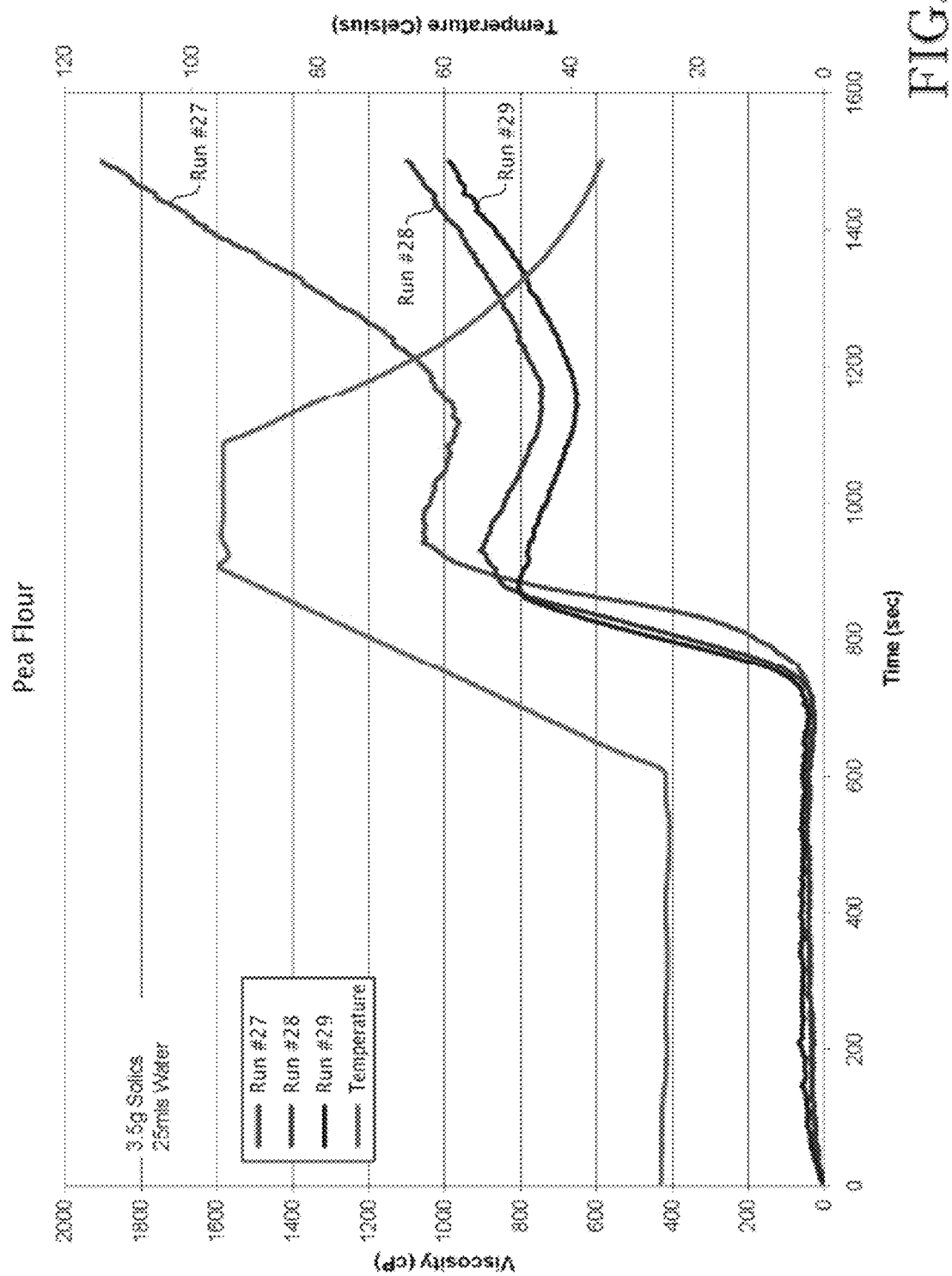
FIG. 15 is a set of RVA curves for the pea flour runs of Example 4.

In this Example, a series of runs #27-30 were performed, using pea flour (runs #27-29) and substantially pure wheat starch (run #30). The extruded products were prepared in accordance with the invention, using the equipment described in Example 1, namely a Wenger Thermal Twin Extruder and a Wenger 450 L HIP Preconditioner. The wheat starch was a commercially available product. At the conclusion of these test runs, the wheat starch product from run 30 was subjected to an RVA analysis, as illustrated in FIG. 14, and the pea flour products were likewise analyzed, as set forth in FIG. 15.

The extruded wheat starch product had a very low maximum viscosity of about 338 cP, which was substantially greater than the pea flour runs #27-29, which exhibited maximum viscosities of 47-65 cP. The products were adequately cooked, non-sticky, and commercially acceptable. The data from these runs is set forth in Table 4, below.

TABLE 4

|  | Run Number | | | |
| --- | --- | --- | --- | --- |
|  | 27 | 28 | 29 | 30 |
|  | Product | | | |
|  | Pea Flour | Pea Flour | Pea Flour | Wheat Starch |
| DRY RECIPE PARAMETERS | | | | |
| Dry Recipe Moisture Content (% wb) | 11.78 | 11.78 | 11.78 | 11.12 |
| Dry Recipe Temperature (° C.) | 15.5 | 15.5 | 15.5 | 15.5 |
| Dry Recipe Rate (kg/hr) | 1364 | 1364 | 1364 | 1364 |
| PRECONDITIONER PARAMETERS | | | | |
| Small Side (rpm/rot) | 640 R | 640 R | 640 R | 640 R |
| Large Side (rpm/rot) | 80 F | 80 F | 80 F | 80 F |
| Steam Flow to Preconditioner (kg/hr) | 127 | 127 | 127 | 127 |
| Water Flow to Preconditioner (kg/hr) | 277 | 280 | 280 | 277 |
| Process Water Temperature (° C.) | 10 | 10 | 10 | 10 |
| Preconditioner Discharge Temperature (Thermocouple) (° C.) | 75 | 76 | 71 | 80 |
| Preconditioner Discharge Temperature (Cup) (° C.) | 74 | 76 | 72 | 81 |
| Preconditioner Weight (kg) | 75.5 | 75.5 | 72.3 | 96.4 |
| Preconditioner Retention Time (screen) (min) | 2.57 | 2.56 | 2.44 | 3.08 |

TABLE 4-continued

| | Run Number | | | |
|---|---|---|---|---|
| | 27 | 28 | 29 | 30 |
| | Product | | | |
| | Pea Flour | Pea Flour | Pea Flour | Wheat Starch |
| EXTRUDER BARREL PARAMETERS | | | | |
| Extruder Shaft Speed (rpm) | 500 | 500 | 500 | 500 |
| Motor Load (%) | 40 | 44 | 24 | 37 |
| Power Used (Power Meter) (kW) | 29 | 30 | 15 | 30 |
| Steam Flow to Extruder (kg/hr) | 88 | 114 | 159 | 118 |
| Water Flow to Extruder (kg/hr) | 0 | 0 | 0 | 0 |
| Process Water Temperature (° C.) | 10 | 10 | 10 | 10 |
| Number of Inserts (0.312 dia) | 10 | 10 | 10 | 10 |
| PRODUCT PROPERTIES | | | | |
| Preconditioner Discharge Moisture (% wb) | 31.58 | 30.81 | 29.92 | 29.13 |
| Extruder Discharge Moisture (% wb) | 31.84 | 31.85 | 32.9 | 31.61 |
| Extruder Discharge Temperature (° C.) | | 105 | | 105 |
| OE Cook (%) | 81.4 | 92.8 | 91.7 | 97.4 |
| Maximum Cold Water Viscosity (cP) | 47 | 53 | 65 | 338 |
| PRECONDITIONER CALCULATIONS | | | | |
| Calculated Moisture in Preconditioner (% wb) | 31.9 | 32.1 | 32.1 | 31.4 |
| Product Mass Flow in Preconditioner (kg/hr) | 1768 | 1771 | 1771 | 1768 |
| Thermal Energy Added in Preconditioner (kJ/hr) | 357165 | 357291 | 357291 | 357165 |
| Total Thermal Energy in Preconditioner (kJ/hr) | 395580 | 395706 | 395706 | 395199 |
| Specific Thermal Energy in Preconditioner (as is) (kJ/kg) | 224 | 223 | 223 | 224 |
| Preconditioner Discharge Energy (kJ/hr) | 338375 | 338556 | 338556 | 337752 |
| Calculated Preconditioner Discharge Temperature (° C.) | 81.2 | 80.9 | 80.9 | 81.5 |
| EXTRUDER BARREL CALCULATIONS | | | | |
| Thermal Energy in Extruder Barrel (kJ/hr) | 582135 | 654336 | 778986 | 664612 |
| Total Mechanical Energy (kJ/hr) | 110367 | 121404 | 66220 | 102090 |
| Total Energy (kJ/hr) | 686535 | 762336 | 832986 | 772612 |
| Calculated Moisture in Extruder Barrel (% wb) | 35.1 | 36.2 | 37.7 | 35.7 |
| Specific Mechanical Energy (as-is dry recipe) (kW-hr/mton) | 21.3 | 22.0 | 11.0 | 22.0 |
| Specific Thermal Energy (as-is dry recipe) (kJ/kg) | 441 | 493 | 585 | 501 |
| Thermal Energy to Mechanical Energy Ratio | 5.8 | 6.2 | 14.8 | 6.3 |
| Total Specific Energy (kJ/kg) | 503 | 559 | 611 | 566 |
| Calculated Temperature Behind Die (° C.) | 151 | 164 | 172 | 167 |

We claim:

1. A method of extruding a starch-bearing product comprising the steps of:
    treating starch-bearing material by moisturizing and heating the material to achieve a cook value of from about 15-60%; and
    extruding said treated material in order to yield an extruded product having a cook value of at least about 55% and a cold water viscosity of up to about 600 cP, said method comprising the steps of subjecting the treated grain to the application of specific thermal energy and specific mechanical energy, wherein the ratio of the applied specific thermal energy to the applied specific mechanical energy is at least about 4.

2. The method of claim 1, said material selected from the group consisting of starch, starch-bearing legumes, starch-bearing grains, and mixtures thereof.

3. The method of claim 2, said starch selected from the group consisting of pure, substantially pure, modified, derivitized, and/or resistant starches.

4. The method of claim 3, said starches selected from the group consisting of rice, wheat, corn, tapioca, potato, arrowroot, arracacha, buckwheat, barley, oat, millet, rye, banana, breadfruit, canna, colacasia, katakuri, kudzu, malanga, oca, polynesian arrowroot, sago, sorghum, sweet potato, taro, pea, and mixtures thereof.

5. The method of claim 2, said starch-bearing legume selected from the group consisting of asparagus bean or snake bean, asparagus pea, baby lima bean, black bean, black turtle bean, Boston bean, Boston navy bean, broad bean, cannellini bean, chickpeas, chili bean, coco bean, cranberry bean, Egyptian bean, Egyptian white broad bean, English bean, fava bean, fava-coceira, field pea, French green beans, frijo bola roja, frijole negro, great Northern bean, green beans, green and yellow peas, kidney beans, lima bean, Madagascar bean, Mexican black bean, Mexican red bean, molasses face bean, mung bean, mung pea, mungo bean, navy bean, pea bean, Peruvian bean, pinto bean, red bean, red eye bean, red kidney bean, rice bean, runner bean, scarlet runner bean, small red bean, small white bean, soy bean or soybean, wax bean, white kidney bean, and white pea bean.

6. The method of claim 2, said starch-bearing grain selected from the group consisting of corn, wheat, sorghum, oats, rice, and mixtures thereof.

7. The method of claim 1, said extruded product having a cold water viscosity of up to about 350 cP and a cook value of about 80-95%.

8. The method of claim 1, said ratio being from about 4 to 35.

9. The method of claim 1, said starch-bearing grain being a part of a pet food formulation.

10. The method of claim 1, said treating step comprising the steps of passing said starch-bearing material through a preconditioning device, and injecting steam into the product during mixing thereof.

11. The method of claim 10, including the step of treating the product in the preconditioning device for a period of from about 30 seconds-5 minutes and at a temperature of from about 100-212° F.

12. The method of claim 1, said extrusion step comprising the step of passing the treated material through an extruder barrel with a retention time of from about 5-90 seconds, and a maximum barrel temperature of from about 100-220° C.

13. The method of claim 1, said product as extruded being essentially free of synthetic surfactant.

* * * * *